United States Patent
Lee et al.

(10) Patent No.: US 10,412,649 B2
(45) Date of Patent: Sep. 10, 2019

(54) METHOD AND APPARATUS FOR PERFORMING HANDOVER PROCEDURE IN WIRELESS COMMUNICATION SYSTEM

(71) Applicant: LG ELECTRONICS INC., Seoul (KR)

(72) Inventors: Insun Lee, Seoul (KR); Daewook Byun, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/778,959

(22) PCT Filed: Mar. 21, 2014

(86) PCT No.: PCT/KR2014/002399
§ 371 (c)(1),
(2) Date: Sep. 21, 2015

(87) PCT Pub. No.: WO2014/148860
PCT Pub. Date: Sep. 25, 2014

(65) Prior Publication Data
US 2016/0050604 A1 Feb. 18, 2016

Related U.S. Application Data

(60) Provisional application No. 61/804,211, filed on Mar. 22, 2013.

(51) Int. Cl.
*H04W 36/22* (2009.01)
*H04W 76/27* (2018.01)
*H04W 36/14* (2009.01)
*H04W 36/00* (2009.01)

(52) U.S. Cl.
CPC .......... *H04W 36/22* (2013.01); *H04W 36/14* (2013.01); *H04W 76/27* (2018.02); *H04W 36/0066* (2013.01)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS

| | | | | |
|---|---|---|---|---|
| 8,494,529 | B2* | 7/2013 | Kim | H04L 45/306 455/410 |
| 9,049,608 | B2* | 6/2015 | Chou | H04W 28/08 |
| 9,204,340 | B2* | 12/2015 | Kim | H04L 45/306 |
| 9,706,423 | B2* | 7/2017 | Horn | H04W 24/10 |
| 10,039,042 | B2* | 7/2018 | Fu | H04W 36/22 |
| 2011/0013587 | A1 | 1/2011 | Serravalle | |
| 2011/0045834 | A1* | 2/2011 | Kim | H04L 45/306 455/438 |

(Continued)

*Primary Examiner* — Michael J Moore, Jr.
*Assistant Examiner* — Prenell P Jones
(74) *Attorney, Agent, or Firm* — Birch, Stewart, Kolasch & Birch, LLP

(57) ABSTRACT

A method for performing a handover procedure in a wireless communication system is provided. A first eNodeB (eNB) of a 3rd generation partnership project (3GPP) long term evolution (LTE) system receives information on an access point (AP) of a wireless local area network (WLAN) system, which is located at neighborhood of a second eNB, to which data of the first eNB can be offloaded, from a user equipment (UE) or a second eNB, and decides whether to handover the UE to the second eNB based on the received information on the AP.

10 Claims, 10 Drawing Sheets

(56) References Cited

U.S. PATENT DOCUMENTS

| | | | |
|---|---|---|---|
| 2012/0002637 A1 | 1/2012 | Adjakple et al. | |
| 2012/0149431 A1 | 6/2012 | Bakker et al. | |
| 2012/0263145 A1 | 10/2012 | Marinier et al. | |
| 2013/0012191 A1* | 1/2013 | Charbit | H04W 52/143 455/422.1 |
| 2013/0083661 A1* | 4/2013 | Gupta | H04W 4/70 370/235 |
| 2013/0083783 A1* | 4/2013 | Gupta | H04W 28/0215 370/338 |
| 2013/0201842 A1* | 8/2013 | Chou | H04W 28/08 370/252 |
| 2013/0242783 A1* | 9/2013 | Horn | H04W 24/10 370/252 |
| 2014/0010207 A1* | 1/2014 | Horn | H04W 36/165 370/332 |
| 2014/0045505 A1* | 2/2014 | Henry | H04W 36/0061 455/444 |
| 2014/0079022 A1* | 3/2014 | Wang | H04W 36/22 370/331 |
| 2014/0082697 A1* | 3/2014 | Watfa | H04W 76/15 726/3 |
| 2014/0199996 A1* | 7/2014 | Wang | H04W 36/14 455/426.1 |
| 2014/0286159 A1* | 9/2014 | Etemad | H04W 36/14 370/230 |
| 2014/0341109 A1* | 11/2014 | Cartmell | H04L 45/308 370/328 |
| 2014/0369201 A1* | 12/2014 | Gupta | H04W 28/0215 370/235 |
| 2014/0376515 A1* | 12/2014 | Lei | H04W 36/0061 370/331 |
| 2015/0365860 A1* | 12/2015 | Yu | H04W 36/04 455/444 |

\* cited by examiner

[Fig. 1]
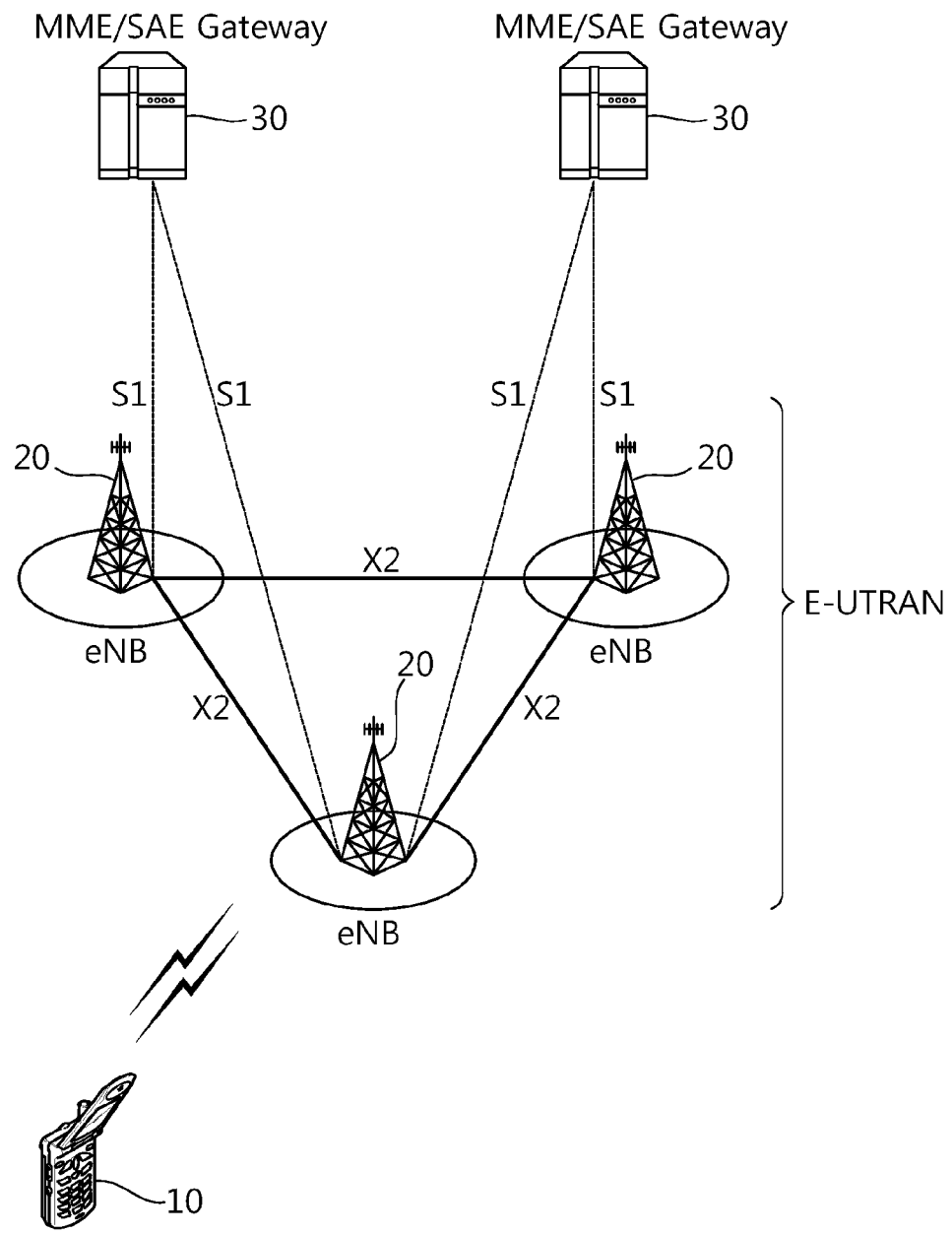

[Fig. 2]
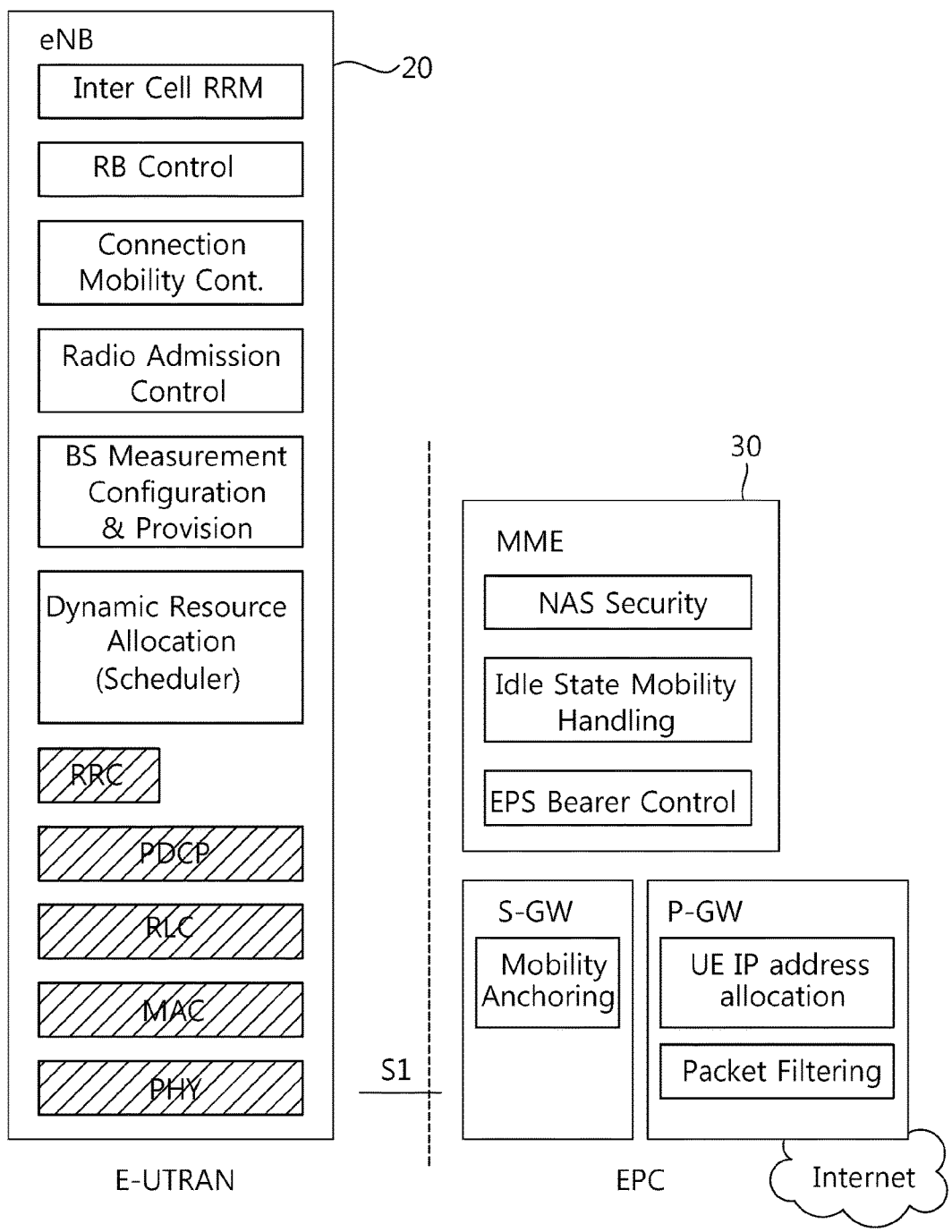

[Fig. 3]
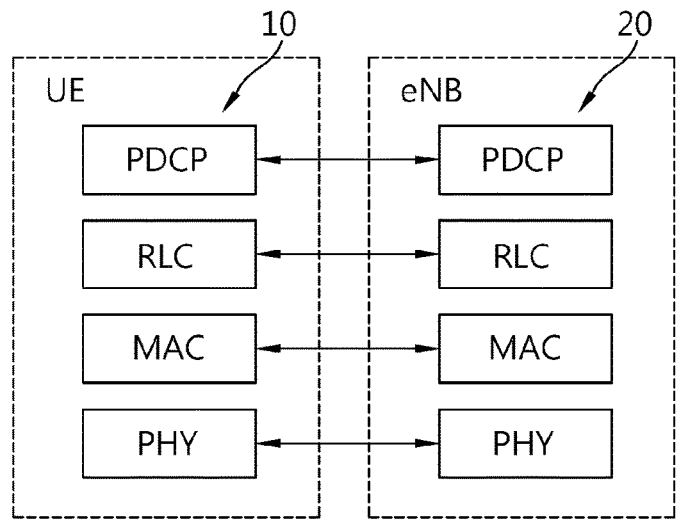
(a)
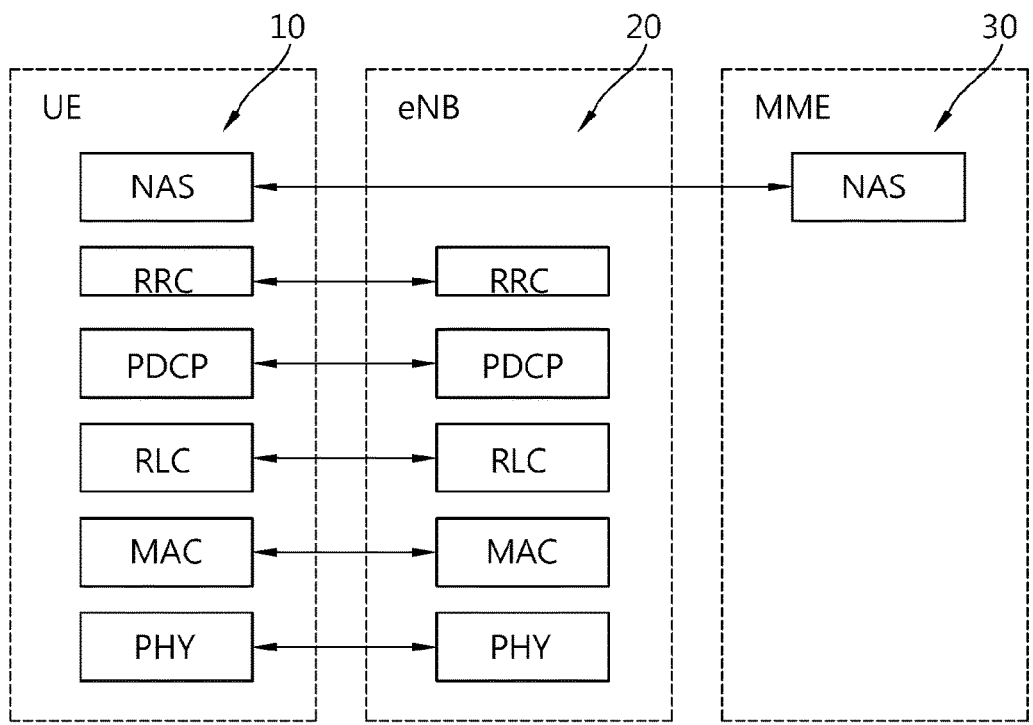
(b)

[Fig. 4]
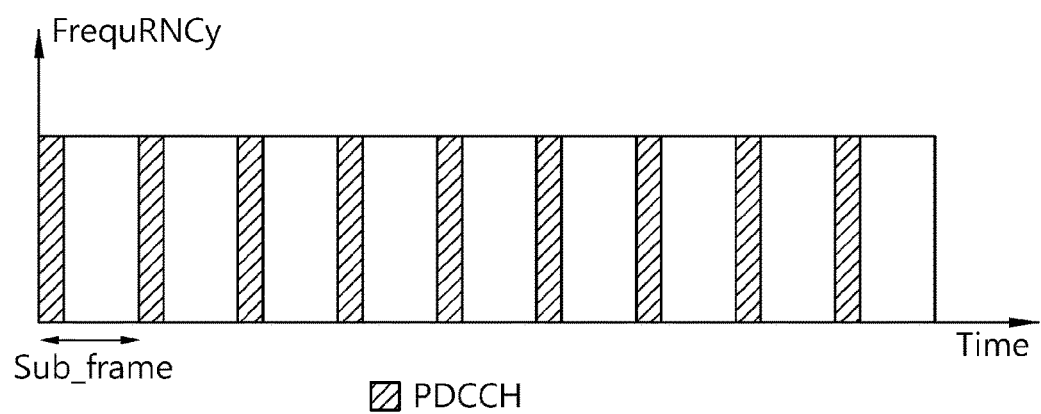

[Fig. 5]
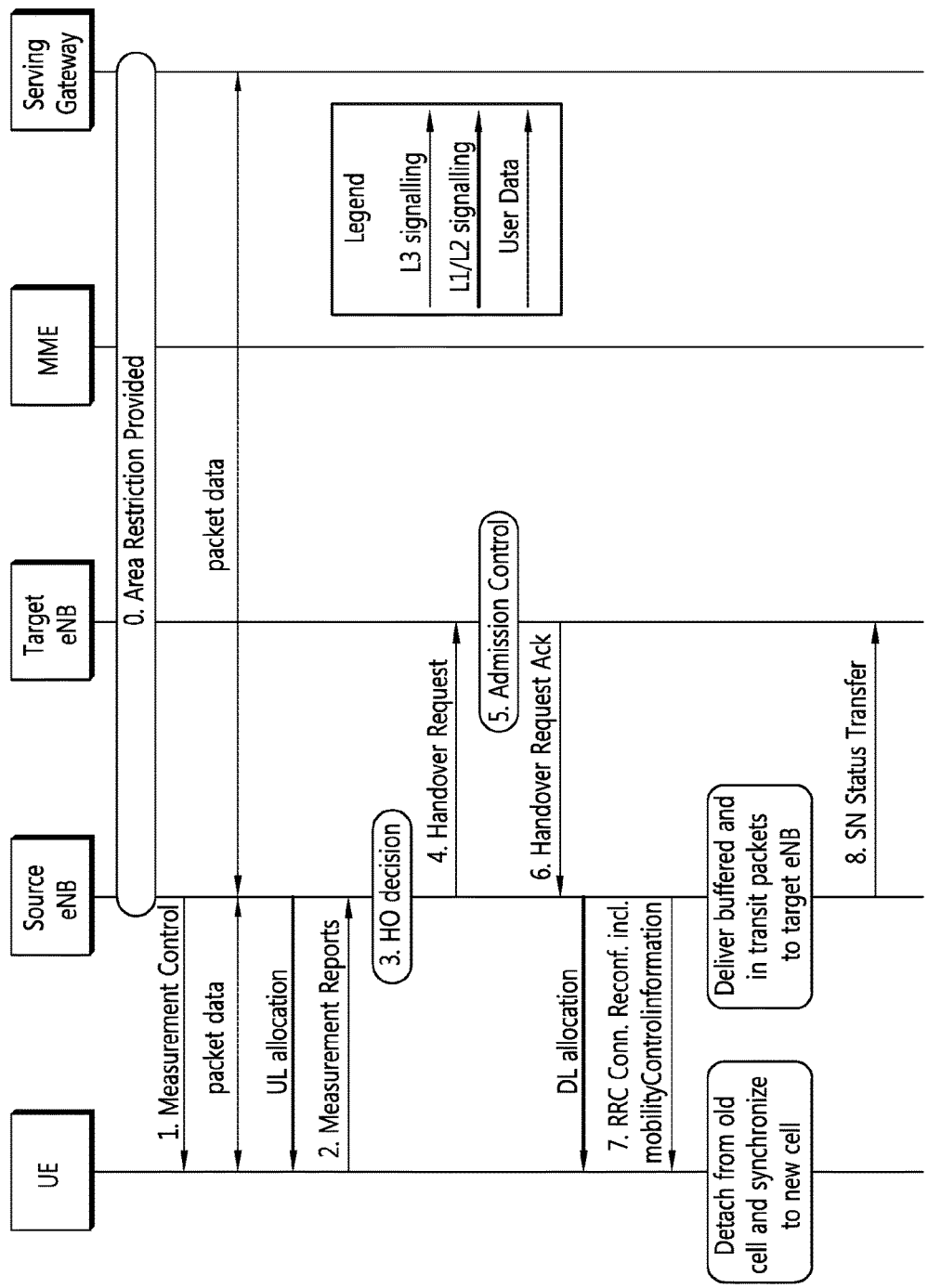

[Fig. 6]
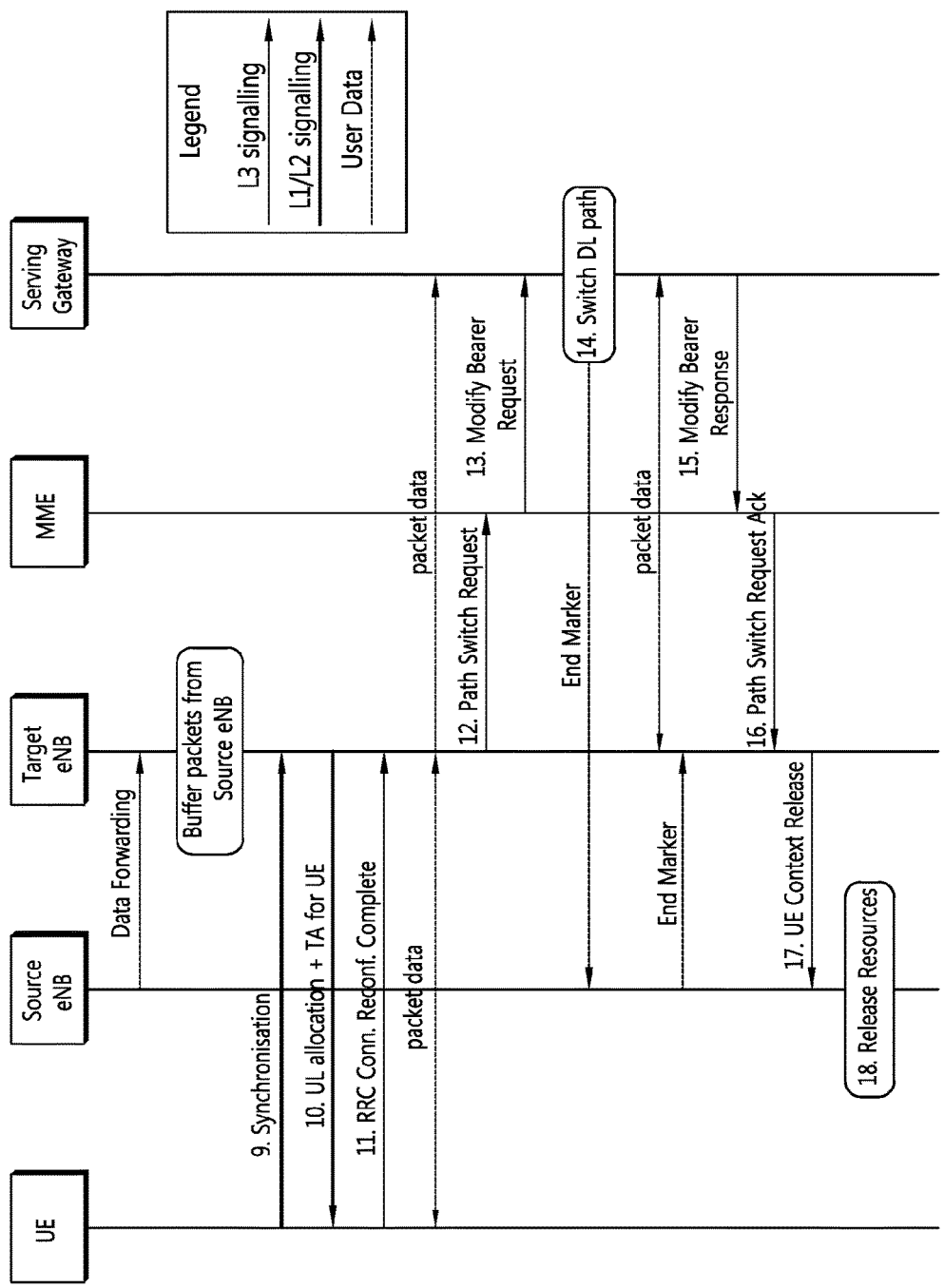

[Fig. 7]
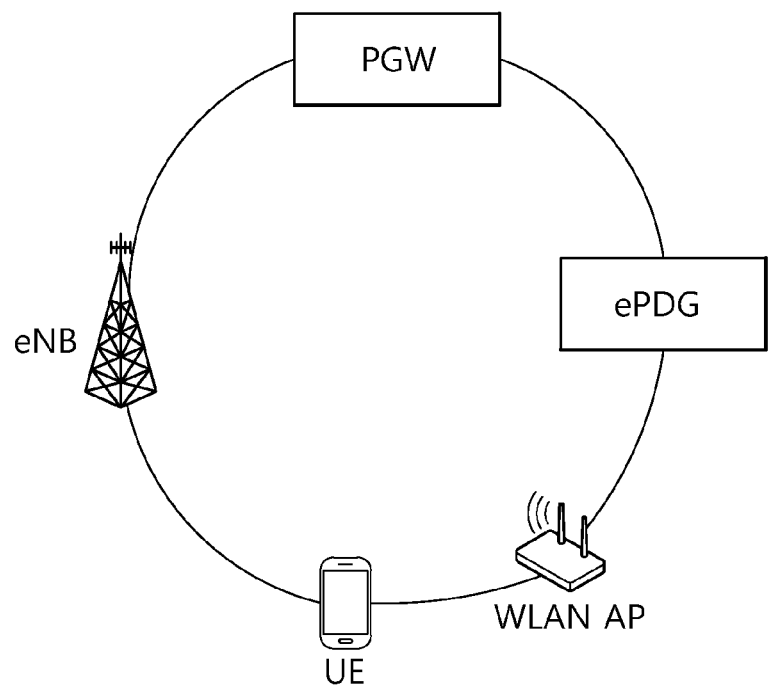
[Fig. 8]
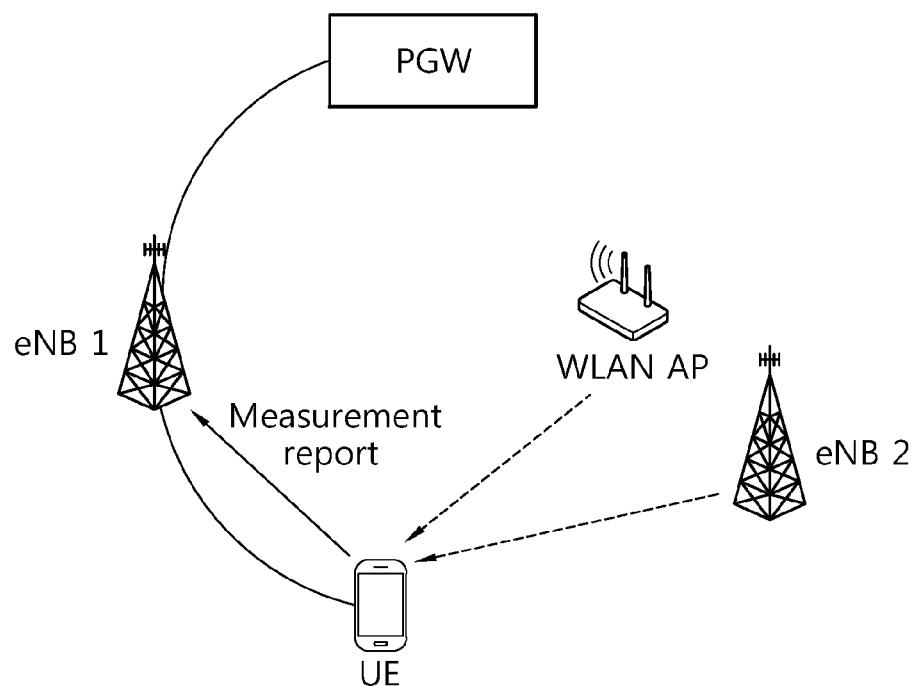

[Fig. 9]
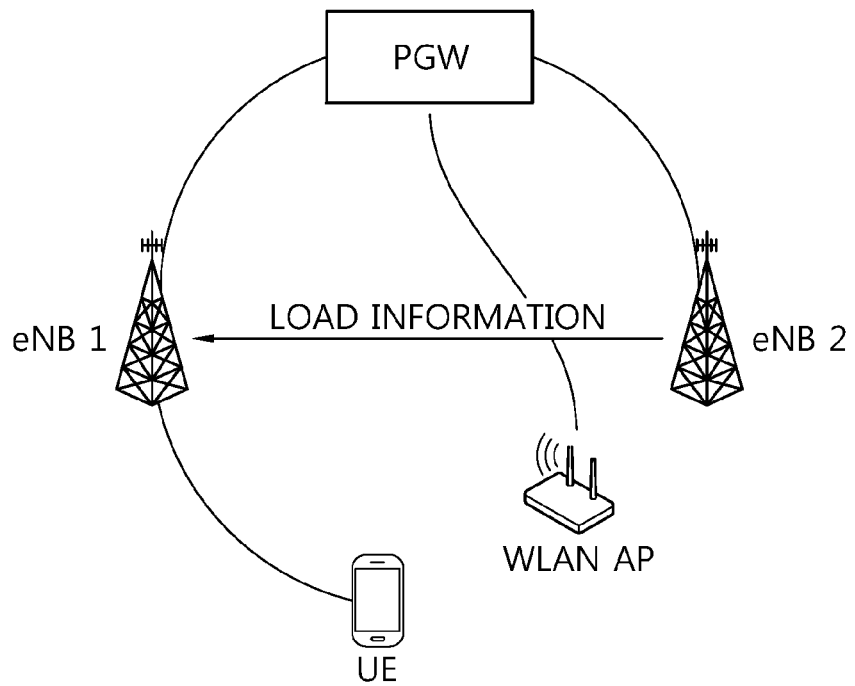

[Fig. 10]
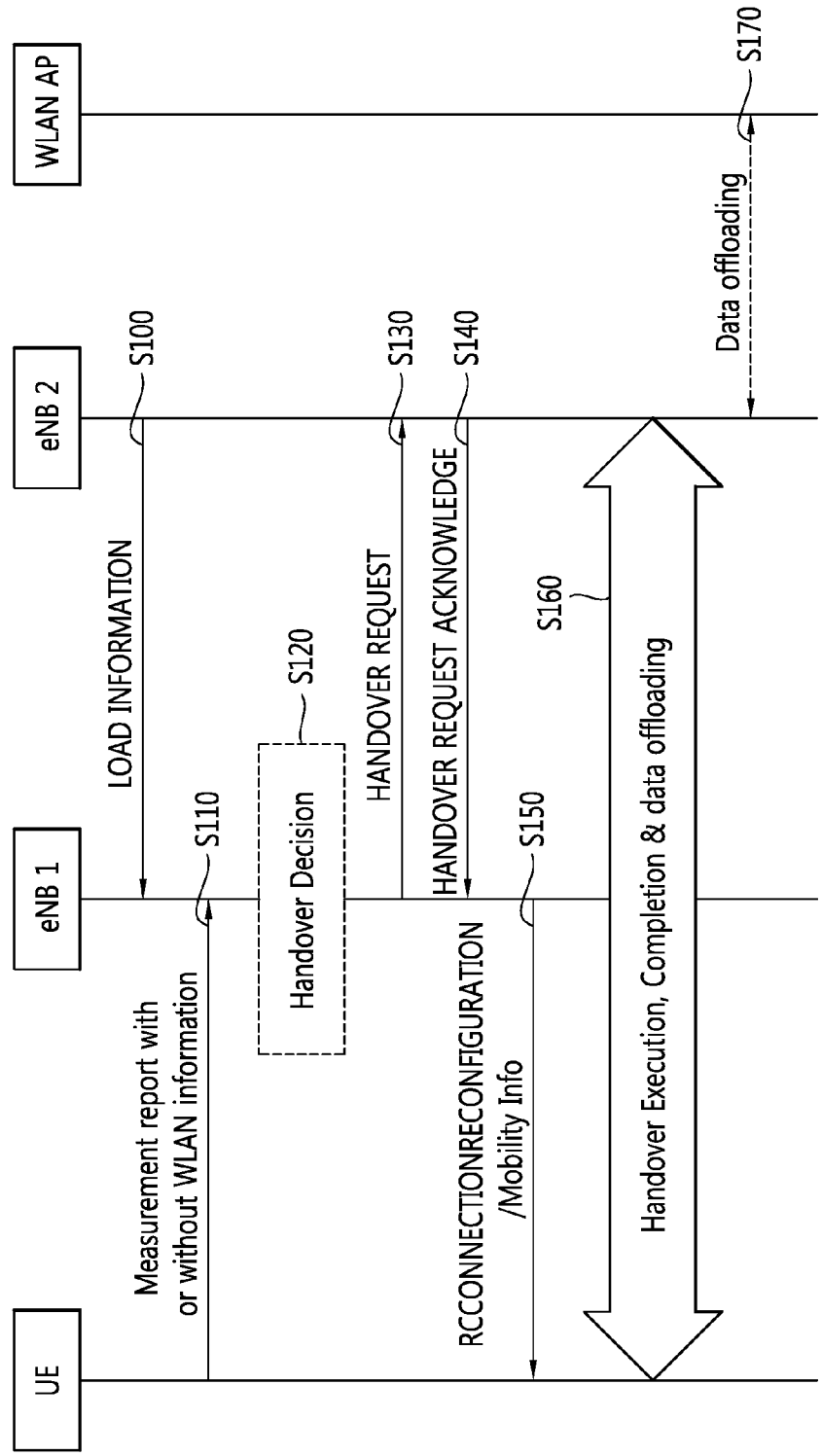

[Fig. 11]
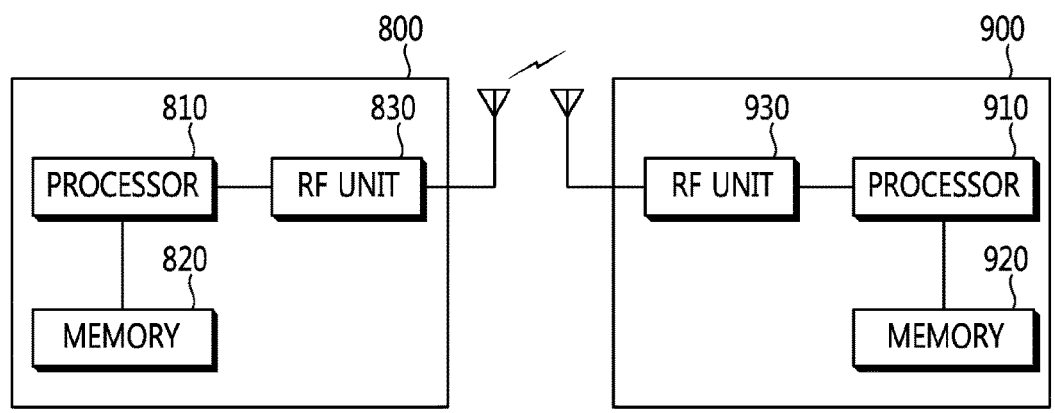

METHOD AND APPARATUS FOR PERFORMING HANDOVER PROCEDURE IN WIRELESS COMMUNICATION SYSTEM

CROSS REFERENCE TO RELATED APPLICATIONS:

This application is the National Phase of PCT/KR2014/002399 filed on Mar. 21, 2014, which claims priority under 35 U.S.C. 119(e) to U.S. Provisional Application No. 61/804,211 filed on Mar. 22, 2013, all of which are hereby expressly incorporated by reference into the present application.

TECHNICAL FIELD

The present invention relates to wireless communications, and more particularly, to a method and apparatus for performing a handover procedure in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+
ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

In a cellular system such as 3GPP system, methods for interworking of the 3GPP system and wireless local area network (WLAN) system has been discussed in order to use limited radio resources effectively. Among various methods for 3GPP-WLAN interworking, a method for offloading traffic of the 3GPP system to the WLAN system has been mainly discussed. By data offloading from the 3GPP system to the WLAN system, radio resources allocated to the 3GPP system and the WLAN system can be used effectively. Data offloading may be called another terminology, e.g., traffic steering.

For 3GPP-WLAN interworking, network discovery methods such as an interworking policy which includes deployment of the WLAN system, etc., have been discussed. One of main purposes of the data offloading is to improve efficiency of limited radio resources of the 3GPP system by using available WLAN system. Accordingly, it is important to discover and/or detect available WLAN system.

SUMMARY OF INVENTION

Technical Problem

The present invention provides a method and apparatus for performing a handover procedure in a wireless communication system. The present invention provides a method for acknowledging presence of an access point (AP) to which data can be offloaded exists in the neighborhood. The present invention provides a method for performing a handover procedure for data offloading by using received information.

Solution to Problem

In an aspect, a method for performing, by a first eNodeB (eNB) of a 3rd generation partnership project (3GPP) long term evolution (LTE) system, a handover procedure in a wireless communication system is provided. The method includes receiving information on an access point (AP) of a wireless local area network (WLAN) system, which is located at neighborhood of a second eNB, to which data of the first eNB can be offloaded, deciding whether to handover a user equipment (UE) to the second eNB based on the received information on the AP, and upon deciding to handover the UE to the second eNB, transmitting a handover request message to the second eNB.

The information on the AP may be received from the UE via a measurement report.

The information on the AP may be received from the second eNB via a load information message.

The information on the AP may be received from the second eNB via a resource status response message or a resource status update message.

The information on the AP may include an indicator indicating presence of the AP.

The information on the AP may include a service set identifier (SSID) of the AP.

The information on the AP may include load information of the WLAN system.

Whether to handover the UE to the second eNB may be decided according to whether the AP can support required resources for the UE.

The handover request message may include an indicator indicating that the handover request message is for data offloading to the WLAN system.

The method may further include receiving a handover request acknowledge message from the second eNB as a response to the handover request message.

The method may further include transmitting a radio resource control (RRC) connection reconfiguration message including mobility information to the UE.

The mobility information may include an indicator indicating that the handover is for data offloading to the WLAN system.

The mobility information may include a SSID of the AP.

In another aspect, a first eNodeB (eNB) of a 3rd generation partnership project (3GPP) long term evolution (LTE) system in a wireless communication system is provided. The first eNB includes a radio frequency (RF) unit for transmitting or receiving a radio signal, and a processor coupled to the RF unit, and configured to receive information on an access point (AP) of a wireless local area network (WLAN) system, which is located at neighborhood of a second eNB, to which data of the first eNB can be offloaded, decide whether to handover a user equipment (UE) to the second eNB based on the received information on the AP, and upon deciding to handover the UE to the second eNB, transmit a handover request message to the second eNB.

Advantageous Effects of Invention

Utilization of a wireless local area network (WLAN) system can be increased, and accordingly, a network and radio resources can be used effectively.

BRIEF DESCRIPTION OF DRAWINGS

FIG. 1 shows LTE system architecture.
FIG. 2 shows a control plane of a radio interface protocol of an LTE system.
FIG. 3 shows a user plane of a radio interface protocol of an LTE system.
FIG. 4 shows an example of a physical channel structure.
FIGS. 5 and 6 show an intra-MME/S-GW handover procedure.
FIG. 7 shows an example of 3GPP-WLAN interworking architecture.
FIG. 8 shows an example of a method for acknowledging presence of an AP according to an embodiment of the present invention.
FIG. 9 shows an example of a method for acknowledging presence of an AP according to another embodiment of the present invention.
FIG. 10 shows an example of a method for performing a handover procedure according to an embodiment of the present invention.
FIG. 11 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

Handover (HO) is described. It may be referred to Section 10.1.2.1 of 3GPP TS 36.300 V11.4.0 (2012-12).

The intra E-UTRAN HO of a UE in RRC_CONNECTED state is a UE-assisted network-controlled HO, with HO preparation signaling in E-UTRAN:

Part of the HO command comes from the target eNB and is transparently forwarded to the UE by the source eNB;

To prepare the HO, the source eNB passes all necessary information to the target eNB (e.g., E-UTRAN radio access bearer (E-RAB) attributes and RRC context): When carrier aggregation (CA) is configured and to enable secondary cell (SCell) selection in the target eNB, the source eNB can provide in decreasing order of radio quality a list of the best cells and optionally measurement result of the cells.

Both the source eNB and UE keep some context (e.g., C-RNTI) to enable the return of the UE in case of HO failure;

UE accesses the target cell via RACH following a contention-free procedure using a dedicated RACH preamble or following a contention-based procedure if dedicated RACH preambles are not available: the UE uses the dedicated preamble until the handover procedure is finished (successfully or unsuccessfully);

If the RACH procedure towards the target cell is not successful within a certain time, the UE initiates radio link failure recovery using the best cell;

No robust header compression (ROHC) context is transferred at handover.

First, C-plane handling is described. The preparation and execution phase of the HO procedure is performed without EPC involvement, i.e., preparation messages are directly exchanged between the eNBs. The release of the resources at the source side during the HO completion phase is triggered by the eNB. In case an RN is involved, its donor eNB (DeNB) relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

FIGS. 5 and 6 show an intra-MME/S-GW handover procedure.

0. The UE context within the source eNB contains information regarding roaming restrictions which were provided either at connection establishment or at the last TA update.

1. The source eNB configures the UE measurement procedures according to the area restriction information. Measurements provided by the source eNB may assist the function controlling the UE's connection mobility.

2. The UE is triggered to send measurement reports by the rules set by i.e., system information, specification, etc.

3. The source eNB makes decision based on measurement reports and radio resource management (RRM) information to hand off the UE.

4. The source eNB issues a handover request message to the target eNB passing necessary information to prepare the HO at the target side (UE X2 signalling context reference at source eNB, UE S1 EPC signalling context reference, target cell identifier (ID), $K_{eNB*}$, RRC context including the cell radio network temporary identifier (C-RNTI) of the UE in the source eNB, AS-configuration, E-RAB context and physical layer ID of the source cell+short MAC-I for possible radio link failure (RLF) recovery). UE X2/UE S1 signalling references enable the target eNB to address the source eNB and the EPC. The E-RAB context includes necessary radio network layer (RNL) and transport network layer (TNL) addressing information, and quality of service (QoS) profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e., an "establishment") or as a delta compared to the AS-configuration used in the source cell (i.e., a "reconfiguration").

6. The target eNB prepares HO with L1/L2 and sends the handover request acknowledge to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e., access parameters, SIBs, etc. The handover request acknowledge message may also include RNL/TNL information for the forwarding tunnels, if necessary.

As soon as the source eNB receives the handover request acknowledge, or as soon as the transmission of the handover command is initiated in the downlink, data forwarding may be initiated.

Steps 7 to 16 in FIGS. 6 and 7 provide means to avoid data loss during HO.

7. The target eNB generates the RRC message to perform the handover, i.e., RRC-ConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the sequence number (SN) status transfer message to the target eNB to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRC-ConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a path switch request message to MME to inform that the UE has changed cell.

13. The MME sends a modify bearer request message to the serving gateway.

14. The serving gateway switches the downlink data path to the target side. The Serving gateway sends one or more "end marker" packets on the old path to the source eNB and then can release any U-plane/TNL resources towards the source eNB.

15. The serving gateway sends a modify bearer response message to MME.

16. The MME confirms the path switch request message with the path switch request acknowledge message.

17. By sending the UE context release message, the target eNB informs success of HO to source eNB and triggers the release of resources by the source eNB. The target eNB sends this message after the path switch request acknowledge message is received from the MME.

18. Upon reception of the UE context release message, the source eNB can release radio and C-plane related resources associated to the UE context. Any ongoing data forwarding may continue.

3GPP-wireless local area network (WLAN) interworking and integration is currently supported by the 3GPP system at the core network (CN) level, including both seamless and non-seamless mobility to the WLAN system. Currently, it has been agreed to study potential radio access network (RAN) level enhancements for 3GPP-WLAN interworking in 3GPP LTE rel-12. The followings are issues which should be taken into account for 3GPP-WLAN interworking.

Operator deployed WLAN networks are often underutilized;

User experience is suboptimal when UE connects to an overloaded WLAN network;

Unnecessary WLAN scanning may drain UE battery resources.

Discussion for 3GPP-WLAN interworking may be divided in two phases. In the first phase, identifying the requirements for RAN level interworking and clarifying the scenarios to be considered while taking into account existing standardized mechanisms may be discussed. In the second phase, identifying solutions addressing the requirements identified in the first phase which cannot be solved using existing standardized mechanisms may be discussed.

The following may be assumed for 3GPP-WLAN interworking.

There is no need to distinguish between indoor and outdoor deployment scenarios.

Solutions developed should not rely on standardized interface between 3GPP and WLAN RAN nodes.

The candidate solutions to be considered should meet the following requirements.

Solutions should provide improved load balancing between WLAN and 3GPP radio access networks in order to provide improved system capacity.

Solutions should improve performance (3GPP-WLAN interworking should not result in decreased but preferable in better user experience).

Solutions should improve the utilization of the WLAN system when it is available and not congested.

Solutions should reduce or maintain battery consumption (e.g. due to WLAN scanning/discovery).

Solutions should be compatible with all existing CN WLAN related functionality, e.g., seamless and non-seamless offload, trusted and non-trusted access, multiple access connectivity (MAPCON) and IP flow mobility (IFOM).

Solutions should be backward compatible with existing 3GPP and WLAN specifications, i.e., work with legacy UEs even though legacy UEs may not benefit from the improvements provided by these solutions.

Solutions should rely on existing WLAN functionality and should avoid changes to IEEE and Wi-Fi Alliance (WFA) specifications.

For data offloading in 3GPP-WLAN interworking, it is important to discover the WLAN system to which the data can be offloaded. For this, policies for network selection have been defined in WLAN_NS. In addition, scenarios for 3GPP-WLAN interworking have been defined in 3GPP RAN2 WG, and for scenarios for 3GPP-WLAN interworking, a stand-alone deployment scenario and a co-located deployment scenario have been discussed.

For offloading data to the WLAN system, a user equipment (UE), which is connected to a NodeB (NB) or eNodeB (eNB) of the 3GPP system, should discover an access point (AP) of the WLAN system to which data can be offloaded. Specifically, in the co-located deployment scenario, data may be offloaded through the AP which is co-located to the UE connected to the eNB.

FIG. 7 shows an example of 3GPP-WLAN interworking architecture. Referring to FIG. 7, a UE has a connection with a packet data network (PDN) gateway (PGW) through the eNB in the 3GPP system, and has a connection with the PGW through the AP in the WLAN system. That is, the UE is connected to the eNB, the eNB may interwork with the AP.

However, a handover procedure considering 3GPP-WLAN interworking has not yet discussed. Accordingly, a method for performing a handover procedure considering offloading to the WLAN system may be required.

Hereinafter, when 3GPP-WLAN interworking is supported, a method for performing a handover procedure for a UE to an eNB which can interwork with a WLAN system is described according to embodiments of the present invention. According to embodiments of the present invention, firstly, a first eNB which serves a UE currently may acknowledge that an AP to which data can be offloaded exists in the neighborhood. The first eNB may acknowledge the presence of the AP in the neighborhood through various methods, which are described later. Then the first eNB may handover the UE to a second eNB which can interwork with the AP for data offloading to the WLAN system. Therefore, load of the 3GPP system can be reduced, and resource utilization of the WLAN system can be improved.

A method for acknowledging, by an eNB, that an AP to which data can be offloaded exists in the neighborhood is described. The eNB may acknowledge the presence of the AP to which data can be offloaded in the neighborhood, and accordingly, may acknowledge the presence of another eNB connected to the AP to which data can be offloaded.

FIG. 8 shows an example of a method for acknowledging presence of an AP according to an embodiment of the present invention.

A first method is that a UE notifies a first eNB of presence of an AP which is available in the neighborhood of the UE by transmitting a measurement report to the first eNB. The UE may be connected to the first eNB, but first eNB may not have a connection with an AP to which data of the first eNB can be offloaded. The UE may scan WLAN signals from an AP in the neighborhood of the UE during channel measurement, may also receive system information from a second eNB. The system information received from the second eNB may include an indicator indicating that the second eNB has a connection with the AP to which data can be offloaded. The system information may further include service set identifier (SSID) of the AP. Upon scanning the AP in the neighborhood and receiving the system information from the second eNB, the UE transmits the measurement report to the first eNB in order to notify that the second eNB which has the connection with the AP to which data can be offloaded exists in the neighborhood. Upon receiving the measurement from the UE, the first eNB may transmit a handover request to the second eNB.

FIG. 9 shows an example of a method for acknowledging presence of an AP according to another embodiment of the present invention.

A second method is that a second eNB directly notifies a first eNB of presence of an AP to which data can be offloaded in the neighborhood of the second eNB. To notify the first eNB, the existing message in 3GPP LTE may be used. For example, a load information message in 3GPP LTE may be used. It may be referred to Section 9.1.2.1 of 3GPP TS 36.423 V11.2.0 (2012-09). The load information message may be sent by an eNB to neighboring eNBs to transfer load and interference co-ordination information. Table 1 shows an example of the load information message.

TABLE 1

| IE/Group Name | Presence | Range | IE type and reference | Semantics description | Criticality | Assigned Criticality |
|---|---|---|---|---|---|---|
| Message Type | M | | | | YES | ignore |
| Cell Information | M | | | | YES | ignore |
| >Cell Information Item | | 1 ... <maxCellineNB> | | | EACH | ignore |
| >>Cell ID | M | | ECGI | Id of the source cell | — | — |
| >>UL Interference Overload Indication | O | | | | — | — |
| >>UL High Interference Information | | 0 ... <maxCellineNB> | | | — | — |
| >>>Target Cell ID | M | | ECGI | Id of the cell for which the HII is meant | — | — |
| >>>UL High Interference Indication | M | | | | — | — |
| >>Relative Narrowband Tx Power (RNTP) | O | | | | — | — |
| >>ABS Information | O | | 9.2.54 | | YES | ignore |
| >>Invoke Indication | O | | 9.2.55 | | YES | ignore |

To notify the first eNB of presence of an AP to which data can be offloaded in the neighborhood of the second eNB, the load information may further include a WLAN indication. Table 2 shows an example of the load information message which further includes the WLAN indication according to an embodiment of the present invention.

TABLE 2

| IE/Group Name | Presence | Range | IE type and reference | Semantics description | Criticality | Assigned Criticality |
|---|---|---|---|---|---|---|
| Message Type | M | | | | YES | ignore |
| Cell Information | M | | | | YES | ignore |
| >Cell Information Item | | 1 ... <maxCellineNB> | | | EACH | ignore |
| >>Cell ID | M | | ECGI | Id of the source cell | — | — |
| >>UL Interference Overload Indication | O | | | | — | — |
| >>UL High Interference Information | | 0 ... <maxCellineNB> | | | — | — |
| >>>Target Cell ID | M | | ECGI | Id of the cell for which the HII is meant | — | — |
| >>>UL High Interference Indication | M | | | | — | — |

TABLE 2-continued

| IE/Group Name | Presence | Range | IE type and reference | Semantics description | Criticality | Assigned Criticality |
|---|---|---|---|---|---|---|
| >>Relative Narrowband Tx Power (RNTP) | O | | | | — | — |
| >>ABS Information | O | | 9.2.54 | | YES | ignore |
| >>Invoke Indication | O | | 9.2.55 | | YES | ignore |
| >>WLAN Information | O | | 9.2.XXX | Can include WLAN AP's SSID, Load information, etc | | |

Referring to Table 2, the load information message includes the WLAN information IE, which indicates information on an AP to which data can be offloaded in the neighborhood of the second eNB. The WLAN information IE may include an SSID of an AP, load information of the WLAN system, etc.

Alternatively, a resource status response message in 3GPP LTE may be used. It may be referred to Section 9.1.2.12 of 3GPP TS 36.423 V11.2.0 (2012-09). The resource status response message may be sent by a second eNB to indicate that the requested measurement, for all or for a subset of the measurement objects included in the measurement is successfully initiated. Table 3 shows an example of the resource status response message.

TABLE 3

| IE/Group Name | Presence | Range | IE type and reference | Semantic description | Criticality | Assigned Criticality |
|---|---|---|---|---|---|---|
| Message Type | M | | 9.2.13 | | YES | reject |
| eNB1 Measurement ID | M | | INTEGER (1 ... 4095, ... ) | Allocated by eNB$_1$ | YES | reject |
| eNB2 Measurement ID | M | | INTEGER (1 ... 4095, ... ) | Allocated by eNB$_2$ | YES | reject |
| Criticality Diagnostics | O | | 9.2.7 | | YES | ignore |
| Measurement Initiation Result | | 0 ... 1 | | List of all cells in which measurement objects were requested, included when indicating partial success. | YES | ignore |
| >Measurement Initiation Result Item | | 1 ... <maxCellineNB> | | | EACH | ignore |
| >>Cell ID | M | | ECGI 9.2.14 | | — | — |
| >>Measurement Failure Cause List | | 0 ... 1 | | It indicates that eNB$_2$ could not initiate the measurement for at least one of the requested measurement objects in the cell. | — | — |
| >>>Measurement Failure Cause Item | | 1 ... <maxFailedMeasObjects> | | | EACH | ignore |
| >>>>Measurement Failed Report Characteristics | M | | BITSTRING (SIZE(32)) | Each position in the bitmap indicates measurement object that failed to be initiated in the eNB$_2$. First Bit = PRB Periodic, Second Bit = TNL load Ind Periodic, Third Bit = HW Load Ind Periodic, | — | — |

TABLE 3-continued

| IE/Group Name | Presence | Range | IE type and reference | Semantic description | Criticality | Assigned Criticality |
|---|---|---|---|---|---|---|
| >>>>Cause | M | | 9.2.6 | Fourth Bit = Composite Available Capacity Periodic, Fifth Bit = ABS Status Periodic. Other bits shall be ignored by the $eNB_1$. Failure cause for measurement objects for which the measurement cannot be initiated. | — | — |

Like the load information message, the resource status response message may also include a WLAN indication in order to notify the first eNB of presence of an AP to which data can be offloaded in the neighborhood of the second eNB. The WLAN information IE may include an SSID of an AP, load information of the WLAN system, etc.

Alternatively, a resource status update message in 3GPP LTE may be used. It may be referred to Section 9.1.2.14 of 3GPP TS 36.423 V11.2.0 (2012-09). The resource status update message may be sent by a second eNB to neighboring first eNB to report the results of the requested measurements. Table 4 shows an example of the resource status update message.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by $eNB_1$ | YES | reject |
| eNB2 Measurement ID | M | | INTEGER (1 ... 4095, ...) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |

Like the load information message, the resource status update message may also include a WLAN indication in order to notify the first eNB of presence of an AP to which data can be offloaded in the neighborhood of the second eNB. The WLAN information IE may include an SSID of an AP, load information of the WLAN system, etc.

When an eNB acknowledges that an AP to which data can be offloaded exists in the neighborhood, a method for performing a handover procedure for data offloading by using received information is described.

FIG. 10 shows an example of a method for performing a handover procedure according to an embodiment of the present invention.

In step S100, a second eNB transmits a load information message to a first eNB. The load information message may include WLAN information notifying presence of an AP to which data can be offloaded in the neighborhood of the second eNB. The load information may use Table 2 described above. Alternatively, the WLAN information may be transmitted via the resource status response message or resource status update message as described above.

In step S110, a UE transmits a measurement report to the first eNB. The measurement report may include the WLAN information which includes information on an AP in the neighborhood of the UE. Alternatively, the measurement report may not include the WLAN information.

In step S120, upon receiving the measurement report from the UE, the first eNB decides whether to handover the UE to the second eNB. In this case, the first eNB may decide whether to handover the UE to the second eNB by taking into account the WLAN system, i.e., the AP in the neighborhood of the second eNB. The first eNB may decide whether to handover the UE to the second eNB according to whether the AP can support required resources for the UE.

In step S130, upon deciding to handover the UE to the second eNB, the first eNB transmits a handover request message to the second eNB. The handover request message may include an indicator indicating that the handover request is for data offloading from the 3GPP system to the WLAN system. In step S140, upon receiving the handover request message from the first eNB, the second eNB transmits a handover request acknowledge message to the first eNB as a response to the handover request message. The handover request acknowledge message may indicate that the handover request acknowledge is for data offloading from the 3GPP system to the WLAN system.

In step S150, upon receiving the handover request acknowledge message, the first eNB transmits a RRCConnectionReconfiguration message including the mobilityControlInformation. The mobilityControlInformation may include an indicator indicating that the handover is for data offloading from the 3GPP system to the WLAN system. The mobilityControlInformation may further include information on the AP such as SSID of the AP, etc.

In step S160, a handover execution procedure and handover completion procedure are performed as the conventional handover execution procedure and handover completion procedure.

In step S170, the second eNB and the AP perform data offloading. Accordingly, data of the 3GPP system can be offloaded to the WLAN system.

FIG. 11 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a first evolved Node-B (eNB) of a third generation partnership project (3GPP) long term evolution (LTE) system, a handover procedure in a wireless communication system, the method comprising:
   receiving, from a user equipment (UE), a measurement report including information on an access point (AP) of a wireless local area network (WLAN) system when the first eNB connected with the UE does not have an AP to which data of the first eNB can be offloaded,
   wherein the information on the AP informs the first eNB that at least one AP to which data can be offloaded is located in a coverage of a second eNB,
   wherein the information on the AP includes a service set identifier (SSID) of the AP which is located in the coverage of the second eNB, and
   wherein the information on the AP is acquired by the UE based on system information including the SSID of the AP, which is transmitted from the second eNB to the UE;
   upon receiving the measurement report from the UE, determining whether or not the AP located in the coverage of the second eNB supports a certain resource required for the UE;
   when the AP located in the coverage of the second eNB supports the certain resource, determining to handover the UE to the second eNB; and
   upon the determining to handover the UE to the second eNB, transmitting a handover request message to the second eNB.

2. The method of claim 1, further comprising:
   receiving, from the second eNB, the information on the AP of the WLAN system via a load information message.

3. The method of claim 1, further comprising:
   receiving, from the second eNB, the information on the AP of the WLAN system via a resource status response message or a resource status update message.

4. The method of claim 1, wherein the information on the AP includes load information of the WLAN system.

5. The method of claim 1, wherein the handover request message includes an indicator indicating that the handover request message is for data offloading to the WLAN system.

6. The method of claim 1, further comprising:
   receiving a handover request acknowledge message from the second eNB as a response to the handover request message.

7. The method of claim 1, further comprising:
transmitting a radio resource control (RRC) connection reconfiguration message including mobility information to the UE.

8. The method of claim 7, wherein the mobility information includes an indicator indicating that the handover is for data offloading to the WLAN system.

9. The method of claim 7, wherein the mobility information includes a service set identifier (SSID) of the AP.

10. A first evolved Node-B (eNB) of a third generation partnership project (3GPP) long term evolution (LTE) system in a wireless communication system, the first eNB comprising:
a transceiver configured to transmit or receive a radio signal; and
a processor coupled to the transceiver, that:
controls the transceiver to receive, from a user equipment (UE), a measurement report including information on an access point (AP) of a wireless local area network (WLAN) system when the first eNB connected with the UE does not have an AP to which data of the first eNB can be offloaded,
wherein the information on the AP informs the first eNB that at least one AP to which data can be offloaded is located in a coverage of a second eNB,
wherein the information on the AP includes a service set identifier (SSID) of the AP which is located in the coverage of the second eNB, and
wherein the information on the AP is acquired by the UE based on system information including the SSID of the AP, which is transmitted from the second eNB to the UE;
upon the transceiver receiving the measurement report from the UE, determines whether or not the AP located in the coverage of the second eNB supports a certain resource required for the UE;
when the AP located in the coverage of the second eNB supports the certain resource, makes a decision to handover the UE to the second eNB; and
upon the processor making the decision to handover the UE to the second eNB, controls the transceiver to transmit a handover request message to the second eNB.

* * * * *